(12) United States Patent
Nathuji et al.

(10) Patent No.: US 8,464,255 B2
(45) Date of Patent: Jun. 11, 2013

(54) MANAGING PERFORMANCE INTERFERENCE EFFECTS ON CLOUD COMPUTING SERVERS

(75) Inventors: Ripal Babubhai Nathuji, Bothell, WA (US); Alireza Ghaffarkhah, Albuquerque, NM (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 12/722,558

(22) Filed: Mar. 12, 2010

(65) Prior Publication Data

US 2011/0225299 A1      Sep. 15, 2011

(51) Int. Cl.
*G06F 9/455* (2006.01)
*G06F 9/46* (2006.01)

(52) U.S. Cl.
USPC ............................................. 718/1; 718/104

(58) Field of Classification Search
None
See application file for complete search history.

(56) References Cited

U.S. PATENT DOCUMENTS

| | | | |
|---|---|---|---|
| 2005/0049901 | A1 | 3/2005 | Diao et al. |
| 2007/0067435 | A1 | 3/2007 | Landis et al. |
| 2007/0240161 | A1 | 10/2007 | Prabhakar et al. |
| 2008/0126547 | A1 | 5/2008 | Waldspurger |
| 2008/0270199 | A1 | 10/2008 | Chess et al. |
| 2010/0083248 | A1* | 4/2010 | Wood et al. ............. 718/1 |

OTHER PUBLICATIONS

Nathuji et al. "Feedback Driven QoS-Aware Power Budgeting for Virtualized Servers", Apr. 9, 2009, pp. 1-6.*

Wentzlaff, et al., "A Unified Operating System for Clouds and Manycore: FOS", Retrieved at << http://groups.csail.mit.edu/carbon/docs/caos_final.pdf >>, CSAIL Technical Reports, Nov. 20, 2009, pp. 1-11.

"Microsoft Virtual Server 2005 R2 Reviewer's Guide", Retrieved at <<http://download.microsoft.com/download/9/3/4/9349f3a2-2 889-4ba5-8e85-6182473c257eVSR2_revguide.doc >>, Microsoft Virtual Server 2005 R2 Reviewer's Guide, pp. 1-40.

"Friendly Virtual Machines: Leveraging a Feedback-Control Model for Application Adaptation", Retrieved at << http://www.researchchannel.org/prog/displayevent.aspx?rID=4362 >>, Microsoft Research, Jul. 20, 2005, pp. 1-2.

Tickoo, et al., "Modeling Virtual Machine Performance: Challenges and Approaches", Retrieved at << http://www.sigmetrics.org/conferences/sigmetrics/2009/workshops/papers_hotmetrics/session3_1.pdf >>, ACM SIGMETRICS Performance Evaluation Review, vol. 37, No. 3, Dec. 2009, pp. 1-15.

Jung, et al., "Generating Adaptation Policies for Multi-Tier Applications in Consolidated Server Environments", Retrieved at << http://www.cercs.gatech.edu/iab09/material/jung.ppt >>, AT&T Labs Research, Apr. 24, 2009, pp. 1-24.

Raghavendra, et al., "No Power Struggles: Coordinated Multi-Level Power Management for the Data Center", Retrieved at << http://www.cs.pitt.edu/~kirk/cs3150spring2010/2008_asplos_nopowerstruggles.pdf >>, ACM SIGOPS Operating Systems Review, ASPLOS'08, vol. 42, No. 2, Mar. 1-5, 2008, pp. 1-12.

(Continued)

*Primary Examiner* — Kenneth Tang (57) ABSTRACT

A method described herein includes an act of receiving indications of threshold levels of quality of service to maintain for each of a plurality of virtual machines sharing computing resources on a server, wherein quality of service is affected by interference caused by the plurality of virtual machines sharing the computing resources on the server. The method also includes an act of dynamically allocating computing resources amongst the plurality of virtual machines to maintain levels of quality of service for each of the plurality of virtual machines at or above the threshold levels of quality of service.

19 Claims, 8 Drawing Sheets

OTHER PUBLICATIONS

Padala, et al., "Adaptive Control of Virtualized Resources in Utility Computing Environments", Retrieved at << http://citeseerx.ist.psu.edu/viewdoc/download?doi=10.1.1.65.3456&rep=rep1&type=pdf >>, Proceedings of the 2nd ACM SIGOPS/EuroSys European Conference on Computer Systems, Mar. 21-23, 2007, pp. 1-14.

Abdelzaher, et al., "Performance Guarantees for Web Server End-Systems: A Control-Theoretical Approach", Retrieved at << http://www.cs.virginia.edu/papers/00980028.pdf >>, IEEE Transactions on Parallel and Distributed Systems, vol. 13, No. 1, Jan. 2002, pp. 80-96.

"Amazon Elastic Compute Cloud", Retrieved at << http://aws.amazon.com/ec2 >>, Amazon Web Services, Retrieved Date Feb. 18, 2010, pp. 1-8.

Barham, et al., "Xen and the Art of Virtualization", Retrieved at << http://www.cl.cam.ac.uk/research/srg/netos/papers/2003-xensosp.pdf >>, Proceedings of the nineteenth ACM symposium on Operating systems principles, Oct. 19-22, 2003, pp. 1-14.

Bobroff, et al., "Dynamic Placement of Virtual Machines for Managing SLA Violations", Retrieved at << http://www.citeulike.org/group/1604/article/1530933 >>, 10th IFIP/IEEE International Symposium on Integrated Network Management, 2007. p. 1.

Clark, et al., "Live Migration of Virtual Machines", Retrieved at << http://www.cl.cam.ac.uk/research/srg/netos/papers/2005-migration-nsdi-pre.pdf >>, Proceedings of the 2nd conference on Symposium on Networked Systems Design & Implementation, vol. 2, May 2-4, 2005, pp. 1-14.

"Google App Engine", Retrieved at << http://code.google.com/appengine >>, Retrieved Date Feb. 18, 2010, pp. 1-4.

Hermenier, et al., "Entropy: A Consolidation Manager for Clusters", Retrieved at << http://gforge.inria.fr/docman/view.php/1603/5955/VEE09-slides.pdf >>, 5th International Conference on Virtual Execution Environments, Mar. 12, 2009, pp. 1-34.

Kansal, et al., "Semantic-Less Coordination of Power Management and Application Performance", Retrieved at << http://research.microsoft.com/pubs/101834/hotpower09kansal.pdf >>, USENIX, Hotpower 2009 (co-located with SOSP 2009), Oct. 10, 2009, pp. 1-5.

Khanna, et al., "Application Performance Management in Virtualized Server Environments", Retrieved at << ftp://140.98.193.215/Proceedings/fromieee/NOMS_2006%20(D)/Papers/TechnicalSessions/S10-P2.pdf >>,10th IEEE/IFIP Symposium, Network Operations and Management, Oct. 23, 2006, pp. 1-9.

Koh, et al., "An Analysis of Performance Interference Effects in Virtual Environments", Retrieved at << http://citeseerx.ist.psu.edu/viewdoc/download?doi=10.1.1.133.8052&rep=rep1&type=pdf >>, In Proceedings of the IEEE International Symposium on Performance Analysis of Systems and Software (ISPASS), 2007, pp. 1-10.

Lin, et al., "Gaining Insights into Multicore Cache Partitioning: Bridging the Gap between Simulation and Real Systems", Retrieved at <<http://www.cse.ohio-state.edu/~luq/publications/hpca08.pdf >>, International Symposium on High Performance Computer Architecture, 2008, pp. 1-12.

"Windows Azure Platform", Retrieved at << http://www.microsoft.com/azure >>, Retrieved Date Feb. 18, 2010, p. 1.

Moscibroda, et al., "Memory Performance Attacks: Denial of Memory Service in Multi-Core Systems", Retrieved at <<ftp://ftp.research.microsoft.com/pub/tr/TR-2007-15.pdf >>, Proceedings of 16th USENIX Security Symposium on USENIX Security Symposium, Aug. 6-10, 2007, pp. 1-21.

Nathuji, et al. "Feedback Driven QOS-Aware Power Budgeting for Virtualized Servers", Retrieved at <<http://controlofsystems.org/febid2009/papers/p13_s13_NathujiEngland.pdf>>, pp. 1-6.

Nathuji, et al., "Virtualpower: Coordinated Power Management in Virtualized Enterprise Systems", Retrieved at <<http://www.sosp2007.org/papers/sosp111-nathuji.pdf>>, SOSP'07, Oct. 14-17, 2007, Stevenson, Washington, USA, pp. 1-14.

Padala, et al. , "Automated Control of Multiple Virtualized Resources", Retrieved at <<http://www.hpl.hp.com/techreports/2008/HPL-2008-123R1.pdf>>, Nov. 21, 2008, pp. 1-17.

Qureshi, et al., "Utility-Based Cache Partitioning: A Low-Overhead, High-Performance, Runtime Mechanism to Partition Shared Caches", Retrieved at <<http://users.ece.utexas.edu/~qk/papers/util.pdf>>, pp. 1-10.

Raghavendra, et al. , "No "Power" Struggles: Coordinated Multi-Level Power Management for the Data Center", Retrieved at http://www.cs.pitt.edu/~kirk/cs3150spring2010/2008_asplos_nopowerstruggles.pdf>>, ASPLOS'08 Mar. 1-5, 2008, Seattle, Washington, USA, pp. 1-12.

Raj, et al. , "Resource Management for Isolation Enhanced Cloud Services", Retrieved at <<http://crypto.cs.stonybrook.edu/ccsw09/slides/rnse.pdf>>, pp. 1-13.

Tullsen, et al. , "Simultaneous Multithreading: Maximizing On-Chip Parallelism", Retrieved at <<http://meseec.ce.rit.edu/eecc722-fall2002/papers/smt/1/ISCA95.pdfl>>, Proceedings of the 22rd Annual International Symposium on Computer Architecture, Santa Margherita Ligure, Italy, Jun. 1995, pp. 1-12.

Verma, et al. , "Power-Aware Dynamic Placement of HPC Applications", Retrieved at http://www.cs.cmu.edu/~dga/15-849/S09/papers/HPC-Power.pdf>>, ICS'08, Jun. 7-12, 2008, Island of Kos, Aegean Sea, Greece, pp. 175-184.

"VMware ESX", Retrieved at <<http://www.vmware.com/products/esx>>, Retrieved Date: Feb. 18, 2010, pp. 1-4.

Wang, et al. , "Co-Con: Coordinated Control of Power and Application Performance for Virtualized Server Clusters", Retrieved at <<http://www.ece.utk.edu/~xwang/papers/iwqos09_cocon.pdf>>, pp. 1-9.

"Windows Server 2008 Hyper-V", Retrieved at <<http://www.microsoft.com/hyperv>>, Retrieved Date: Feb. 18, 2010, pp. 1-2.

Xie, et al. , "Pipp: Promotion/Insertion Pseudopartitioning of Multi-Core Shared Caches", Retrieved at <<http://www.cc.gatech.edu/~loh/Papers/isca2009-pipp.pdf>>, In the proceedings of the 36th ACM/IEEE International Symposium on Computer Architecture, Jun. 2009, pp. 1-10.

Zhang, et al. , "Towards Practical Page Coloring-Based Multicore Cache Management", Retrieved at <<http://www.cs.rochester.edu/~kshen/papers/eurosys2009.pdf>>, EuroSys'09, Apr. 1-3, 2009, Nuremberg, Germany, pp. 14.

\* cited by examiner

MANAGING PERFORMANCE INTERFERENCE EFFECTS ON CLOUD COMPUTING SERVERS

BACKGROUND

Currently, commercial cloud computing services are equipped to provide businesses with computation and data storage services, thereby allowing businesses to replace or supplement privately owned information technology (IT) assets, alleviating the burden of managing and maintaining such privately owned IT assets. While feasibility of cloud computing has grown over the last several years, there exists some technological hurdles to overcome before cloud computing becomes adopted in a widespread manner.

One problem that is desirably addressed pertains to the sharing of computing resources by multiple customers. Cloud computing platforms routinely employ virtualization to encapsulate workloads in virtual machines, which are then consolidated on cloud computing servers. Thus, a particular cloud computing server may have multiple virtual machines executing thereon that correspond to multiple different customers. Ideally, for any customer utilizing the server, the use of resources on the server by other virtual machines corresponding to other customers is transparent. Currently, cloud computing providers charge fees to customers based upon usage or reservation of resources such as, but not limited to, CPU hours, storage capacity, and network bandwidth. Service level agreements between the customers and cloud computing providers are typically based upon resource availability, such as guarantees in terms of system uptime, I/O requests, etc. Accordingly, a customer can enter into an agreement with a cloud computing services provider, wherein such agreement specifies an amount of resources that will be reserved or made available to the customer, as well as guarantees in terms of system uptime, etc.

If a customer is not utilizing all available resources of a server, however, it is in the interests of the cloud computing services provider to cause the customer to share computing resources with other customers. This can be undertaken through virtualization, such that workloads of a customer can be encapsulated in a virtual machine, and many virtual machines can be consolidated on a server. Virtualization can be useful in connection with the co-hosting of independent workloads by providing fault isolation, thereby preventing failures in an application corresponding to one customer from propagating to another application that corresponds to another customer. Virtualization, however, does not guarantee performance isolation between virtual machines. That is, even though the virtual machines are reserved certain resources, simultaneously executing virtual machines on a cloud computing server can cause performance interference between such virtual machines. In a specific example, a virtual machine assigned to one core of a multi-core processor on a cloud computing server may experience significantly reduced performance when another application simultaneously executes on an adjacent core due to an increased miss rate in a last level cache. Accordingly, a customer may enter into a service level agreement with a cloud computing service, purchase or reserve resources for computation or storage, and due to performance interference, may not obtain the quality of service expected.

SUMMARY

The following is a brief summary of subject matter that is described in greater detail herein. This summary is not intended to be limiting as to the scope of the claims.

Described herein are various technologies pertaining to dynamically provisioning computing resources amongst a plurality of virtual machines executing on a cloud computing server to maintain threshold levels of quality of service for the plurality of virtual machines in view of effects of performance interference caused by the sharing of computing resources amongst the plurality of virtual machines. The quality of service pertaining to any particular virtual machine can be set forth in an agreement between a customer and a cloud services computing provider, and may be in terms of performance with respect to any suitable parameter. For example, a customer may wish to have a threshold number of instructions per second executed on the server, and thus such number of instructions per second is the quality of service desired by the customer. In another example, a different customer may wish to have a certain response time or data throughput with respect to a certain application, and accordingly the quality of service may be in terms of response time or data throughput.

To maintain threshold quality of service levels for a plurality of virtual machines executing on a cloud computing server, a relationship between workloads corresponding to the virtual machines and computing resources allocated to the virtual machines can be modeled. For example, a multi-input multi-output (MIMO) predictive model can be configured to receive measured workloads of virtual machines executing on the computing server and data indicative of computing resources allocated to the virtual machines, such that the MIMO model can output predictive quality of service levels for certain resource allocations. The MIMO model can be updated/tuned at runtime of the virtual machines. Using the MIMO model, a controller can be configured to allocate computing resources amongst virtual machines executing on a cloud computing server, such that the threshold levels of quality of service are met for each of the plurality of virtual machines. Accordingly, the controller can take into consideration performance interference effects caused by virtual machines sharing computing resources on the cloud computing server.

If additional resources exist after resources have been allocated to cause the virtual machines to execute with the threshold levels of quality of service, additional resources can be allocated to a subset of the plurality of virtual machines to cause the subset of the plurality of virtual machines to experience levels of quality of service above the threshold levels. Such additional resources can be allocated to virtual machines, for instance, based upon indications from customers corresponding to the virtual machines that such customers are willing to pay more for additional levels of quality of service. For example, a customer may indicate that such customer is willing to pay a certain amount of money if a number of instructions executed per second are increased by a certain amount. The MIMO model can be utilized to predict an amount of resources needed to be allocated to a virtual machine of the customer to meet the additional level of quality of service. If sufficient resources exist to cause the virtual machine to experience the additional level of quality of service, then the controller can allocate resources to the virtual machine accordingly.

Other aspects will be appreciated upon reading and understanding the attached figures and description.

DETAILED DESCRIPTION

Various technologies pertaining to automatically provisioning resources amongst virtual machines sharing resources on a cloud computing server to accommodate for interference effects caused by the sharing of resources on such cloud computing server will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

The description herein includes examples of virtual machines executing on cloud computing servers. It is to be understood, however, that one or more applications may execute in a virtual machine, and the claims are intended to encompass resource allocation to a virtual machine as well as to one or more applications executing in a virtual machine. Thus, for the purposes of interpreting the claims, the terms "virtual machine" and "application" can be used interchangeably.

Figure 1:
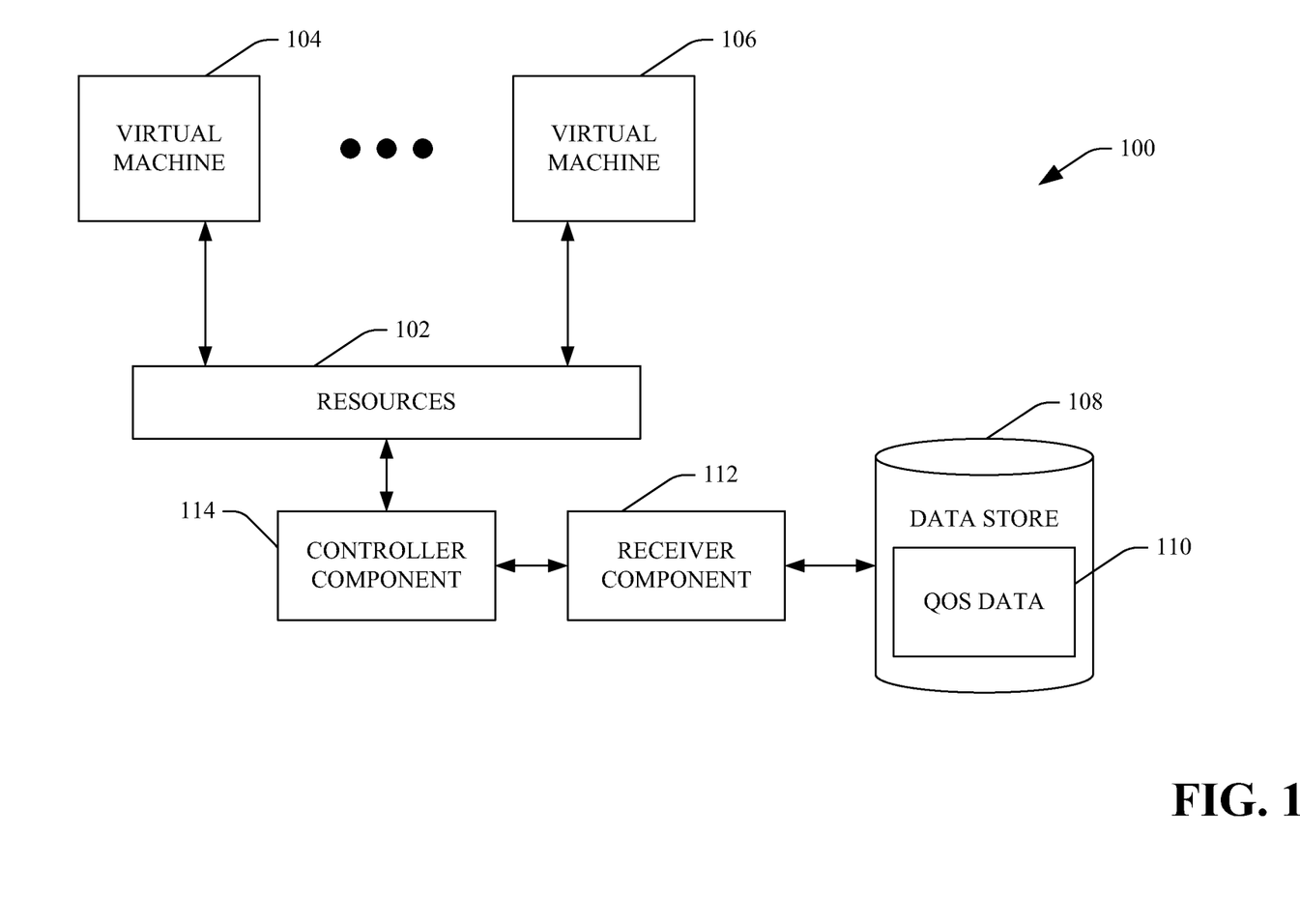
FIG. 1 is a functional block diagram of an example system that facilitates dynamically allocating resources amongst virtual machines sharing resources on a server computing device at runtime to account for effects of performance interference.

With reference to FIG. 1, an example system 100 that facilitates automatic provisioning of resources to maintain threshold levels of quality if service amongst a plurality of virtual machines sharing resources on a cloud computing server is illustrated. The system 100 includes computing resources 102, wherein the computing resources 102 may be, for example, memory, network bandwidth, I/O, cores on a multi-core processor, or other computing resources that can be found on a cloud computing server. "Cloud computing" refers to services that utilize a collection of computing devices that can be accessible to clients by way of the Internet to perform computing or data storage tasks for customers. For example, many of such computing tasks include high end computation, data storage and backup, and other information technology (IT) functions. Generally, clients of cloud computing services pay fees for the use of particular resources on cloud computing servers, such as an amount of data storage, a percentage of available CPU cycles, etc.

A plurality of virtual machines 104-106 are configured to share the computing resources 102, wherein the virtual machines 104-106 are executing on a server that includes the computing resources 102. Virtualization is often utilized to support fault isolation. Thus, a customer corresponding to the virtual machine 104 can abstractly view the first virtual machine 104 as a stand-alone computing device. Accordingly, if an error occurs in the virtual machine 106, such error will not be propagated to the virtual machine 104. While such virtual machines 104 and 106 are separate in the abstract, because the virtual machines 104 and 106 share the resources 102, in actuality performance of applications executing in such virtual machines 104-106 can be affected as other virtual machines/applications share the computing resources 102. Pursuant to an example, each of the virtual machines can correspond to a different customer. Thus, the virtual machine 104 may correspond to a first customer of cloud computing services that utilizes the cloud computing server, and the virtual machine 106 may correspond to an nth customer of the cloud computing services.

The system 100 further comprises a data store 108, which can be a hard drive, memory, disk, or other suitable non-transitory data store. The data store 108 comprises quality of service data 110 pertaining to each of the virtual machines 104-106. Pursuant to an example, a customer of cloud computing services may have a service level agreement with the provider of the cloud computing services that indicates that the customer is guaranteed a particular level of quality of service for a certain application/virtual machine. This is different from conventional approaches, where typically customers pay for resources. As indicated previously, however, execution on a cloud computing server of multiple virtual machines can cause performance of each of the virtual machines to degrade due to the effects of performance interference. Therefore, even though the virtual machines have access to resources as provided in service level agreements, a virtual machine corresponding to a customer may not experience the level of quality of service that the customer would like.

The quality of service data 110 may be any suitable quality of service, including, for instance, a number of instructions executed per second, speed of memory accesses, or other performance criteria. The claims herein are not limited to the type of quality of service, and customers and providers of cloud computing services can negotiate for any suitable type of quality of service. Again, each customer can negotiate for a different quality of service. Accordingly, a customer corresponding to the virtual machine 104 may have negotiated a first level of quality of service of a first type, while a customer corresponding to the virtual machine 106 may have negotiated a second level of quality of service of a second type. Moreover, as will be described in greater detail below, the customers that correspond to the virtual machines 104-106 can indicate that they would optionally like to have higher discrete levels of quality of service if such levels become available, and that they are willing to pay for such higher levels of quality of service if sufficient computing resources are available. For each of the virtual machines executing on the cloud computing server, however, there may be a minimum threshold level of quality of service that is agreed upon between the customers and the cloud computing service provider.

The system 100 can also comprise a receiver component 112 that is configured to receive the quality of service data 110 (threshold levels of quality of service) that correspond to the plurality of virtual machines 104-106 executing on the cloud computing server. A controller component 114 is in communication with the receiver component 112 and can dynamically provision the computing resources 102 of the server computing device amongst the plurality of virtual machines 104-106 to maintain the threshold levels of quality of service in the quality of service data 110 for the plurality of virtual machines 104-106. For example, the virtual machine 104 may initially be allocated certain resources to perform a computing task, and may be executing in accordance with a threshold level of quality of service agreed upon between the customer corresponding to the virtual machine 104 and the cloud computing services provider. The virtual machine 106 may also be executing on the server, such that the computing resources 102 are shared between the virtual machines 104 and 106. The virtual machine 106 may begin performing computational tasks that impact execution of the virtual machine 104. For example, the virtual machine 104 may experience a negative performance impact caused by execution of the virtual machine 106 on the cloud computing server (performance interference). The controller component 114 can allocate some of the computing resources 102 to the virtual machine 104 to maintain the threshold quality of service values agreed upon between the customer corresponding to the virtual machine 104 and the provider of the cloud computing services. In allocating such resources, the controller component 114 can also ensure that a threshold level of quality of service agreed upon between the customer corresponding to the virtual machine 106 and the cloud computing services provider is met.

As will be described in greater detail below, the controller component 114 can dynamically provision resources amongst the virtual machines 104-106 while taking into consideration performance interference effects of the virtual machines 104 and 106 sharing the computing resources 102 based at least in part upon a modeled relationship between resource allocations between the virtual machines 104 and 106 and quality of service experienced by such virtual machines 104 and 106. For example, as will be described below, the controller component 114 can comprise a multi-input/multi-output (MIMO) model that can model a relationship between quality of service experienced by virtual machines and computing resources allocated to such virtual machines. Such a model can be utilized to output a predicted quality of service experienced by such applications executing on the virtual machines given proposed resource allocations amongst the virtual machines 104-106.

Figure 2:
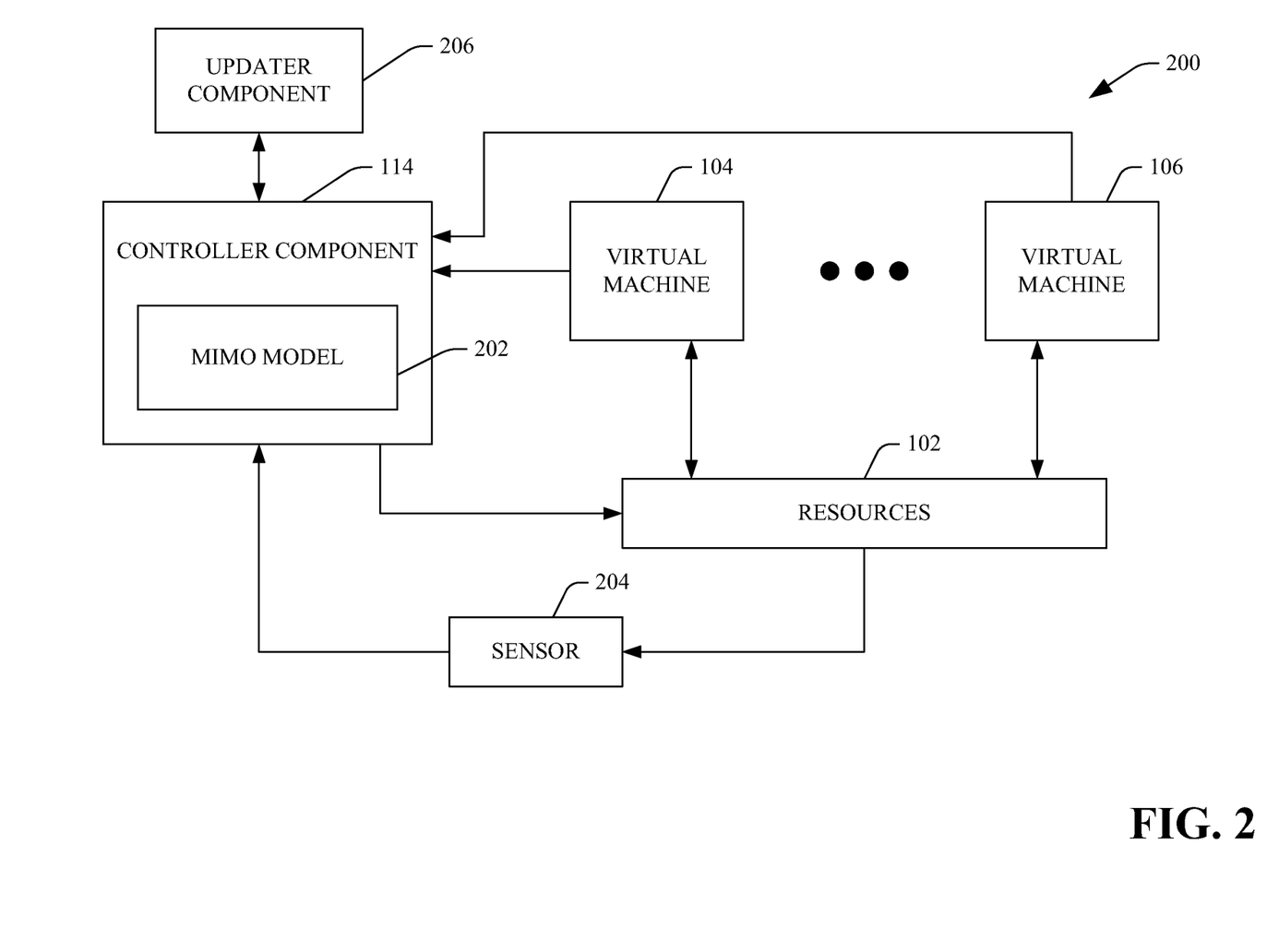
FIG. 2 is a functional block diagram of an example system that facilitates using a multi-input/multi-output model to dynamically allocate resources amongst virtual machines while taking into consideration performance interference.

Referring now to FIG. 2, an example system 200 that facilitates dynamically provisioning computing resources amongst a plurality of virtual machines on a server computer in a cloud computing environment to maintain threshold levels of quality of service for such virtual machines is illustrated. The system 200 comprises the virtual machines 104-106 that are executing on a cloud computing server, wherein the cloud computing server comprises the computing resources 102 that are shared amongst the virtual machines 104-106. In an example, the computing resources 102 may comprise a multi-core processor, wherein a virtual machine can be assigned a core or a portion of a core. As indicated above, the controller component 114 can cause portions of the computing resources 102 to be dynamically allocated amongst the virtual machines 104-106 to maintain threshold levels of quality of service for such virtual machines 104-106 by taking into consideration effects of performance interference caused by the virtual machines 104-106 sharing the computing resources 102.

The controller component 114 comprises a multi-input/multi-output (MIMO) model 202, which is a computer-implemented model. The MIMO model 202 can be configured to model a relationship between resource allocations amongst virtual machines and quality of service experienced by such virtual machines. The MIMO model 202 may be a linear model in one example. In another example, the MIMO model 202 may be nonlinear model. Selection of the MIMO model 202 as being linear or nonlinear can be based at least in part upon service level agreements between the provider of the cloud computing services and customers corresponding to the virtual machines 104-106.

The MIMO model 202 can be configured to receive performance data from the virtual machines 104-106 (and/or applications executing therein) and from hardware of the cloud computing server. Specifically, the MIMO model 202 can be configured to receive computing resources allocated to the virtual machines 104-106 individually, as well as quality of service experienced by the virtual machines 104-106 when provided such resources. For instance, a sensor 204 or sensors may be configured to monitor computing resources provided to the virtual machines 104-106 over time. In an example, the sensor 204 may be configured to monitor control actuators corresponding to the computing resources 102. As indicated above, the MIMO model 202 may also be configured to receive application feedback from the virtual machines 104-106. In an example, the controller component 114 may be included in a hypervisor, and feedback from the virtual machines 104-106 can be received by way of a virtual bus. It is to be understood, however, that any suitable implementation that comprises receiving performance feedback from the virtual machines 104-106 is contemplated by the inventors, and is intended to fall under the scope of the hereto-appended claims.

Type of performance feedback received from the virtual machines 104-106 can depend, for example, on service level agreements agreed upon between customers corresponding to the virtual machines 104-106 and the cloud computing service provider. For instance, a customer corresponding to the virtual machine 104 may wish to experience a certain number of instructions executed per second, while the customer corresponding to the virtual machine 106 may wish to have some sort of I/O response time as the threshold level of quality of service. Accordingly, the virtual machines 104-106 can be configured to provide any suitable performance (workload) feedback that can be utilized to model the relationship between resources allocated to the virtual machines 104-106 and quality of service experienced by the virtual machines 104-106 given such provision of resources.

Pursuant to a particular example, the MIMO model 202 can be a discrete time MIMO model, with p inputs and q outputs. The inputs $u_1[k], u_2[k], \ldots, u_p[k]$ of the MIMO model 202 may, for instance, be received from actuators utilized by a platform controller to manage resource allocations at time step k. Pursuant to an example, a virtual processor capping mechanism can be utilized with respect to each virtual machine 104-106 to throttle processing resources applications executing in such virtual machines 104-106 can utilize. The outputs $y_1[k], y_2[k], \ldots, y_q[k]$ of the MIMO model 202 can be predicted quality of service values for the virtual machines 104-106 at time step k. The stacked vectors of the inputs and outputs can be denoted by $u[k]=[u_1[k], u_2[k], \ldots, u_p[k]]^T$ and $y[k]=[y_1[k], y_2[k], \ldots, y_q[k]]^T$, respectively. The general MIMO model may then be given by a set of nonlinear difference equations:

$$y[k]=\Phi(y[k-1], \ldots, y[k-n], u[k], \ldots, u[k-m]) \quad (1)$$

where $\Phi(\ )$ determines outputs at time step k based at least in part upon previous outputs as well as current and previous inputs. The impact of previous outputs on the values at the current time step can be determined by the parameter n, and can be referred to as the order of the system. Similarly, the value m can be utilized to determine to what extent previous values of the input continue to impact the output at time step k. When n or m are non-zero, the current output may depend on the history of prior inputs and outputs.

One of ordinary skill in the art will contemplate that modeling a nonlinear dynamic system as depicted by Equation (1) may be challenging. Thus, the MIMO model 202 may be a simplified model that can capture the aforementioned input/outputs interactions with a relatively small amount of uncertainty. For instance, the MIMO model 202 may be a static model which can be specified as $y[k]=\Phi(u[k])$ with $n=m=0$. For instance, when the range of inputs that are to be controlled is relatively small, the MIMO model 202 may be $y[k]=Au[k]+b$. The model parameters A and b can be learned through utilization of any suitable learning algorithm, including least mean squares or recursive least squares algorithms. In this example, the MIMO model 202 can be learned at runtime, as the virtual machines 104-106 are placed on the cloud computing server, thereby allowing the controller component 114 to rapidly tune resource allocations as interference effects are observed.

It is to be noted that other types of models are contemplated, and some are described below. It can be noted that a most accurate model in general can depend upon workloads of virtual machines 104-106 that are being considered, and the level of accuracy may depend upon a type of control being applied. For instance, if the control being applied requires capturing system dynamics and nonlinearities, neural networks may be employed to estimate the relationships described in Equation (1). Once the MIMO model 202 has been learned, the controller component 114 can determine control inputs through solving a constrained optimization problem that leverages the predictive capabilities provided by the model. For instance, if the MIMO model 202 is represented by $y[k]=Au[k]+b$, the following equation can provide an overview of the optimization-based control:

$$u^*=\mathrm{argmin}_u \Lambda(y)=\mathrm{argmin}_u \Lambda(Au+b)$$

s.t.

$u \in \mu$ $$\Psi(y)=\Psi(Au+b) \leq 0 \qquad (2)$$

where $u^*$ can represent a substantially optimal set of inputs based upon $\Lambda(y)$ and $\Psi(y)$. As denoted by $\mathrm{argmin}_u$, in Equation (2), the controller component 114 locates among the possible input vectors u the input vector which substantially minimizes $\Lambda(y)$. For instance, $\Lambda(y)$ can quantify a deviation from service level agreement outputs prescribed to the controller component 114. The goal of this optimization can be to find a substantial minimum of this function, where u is in the space of allowable inputs $\mu$, and constraints on the output represented by $\Psi(y) \leq 0$ are met. For instance, it may be desirable to meet some service level agreement outputs $y_{SLA}$, $\Psi(y)=y_{SLA}-y$. In this manner, $\Lambda(y)$ and $\Psi(y)$ can be chosen based upon desired quality of service metrics for each of the virtual machines 104-106 consolidated on the cloud computing server.

In summary, the MIMO model 202 may be a linear or nonlinear model, and can be learned and adapted online. For instance, an updater component 206 can be utilized to update the MIMO model 202 over time (e.g., as virtual machines 104-106 are added or removed from the cloud computing server). The updater component 206 may employ any suitable algorithm in connection with updating the MIMO model 202. The MIMO model 202 can be utilized as a prediction tool for optimization-based control. A benefit of this approach is that the MIMO model 202 can be employed to determine whether provisioning additional resources to a virtual machine/application results in an improvement to quality of service, and subsequently if such overprovisioning may negatively impact other workloads.

As indicated previously, each of the virtual machines may correspond to customers who wish to have a threshold level of quality of service. In some instances, however, a customer may be willing to pay more in certain circumstances if additional resources are available to the customer that allow quality of service to be increased. Pursuant to an example, a customer may request a level of quality of service that may require half a processing core for a corresponding virtual machine when such virtual machine runs in isolation (e.g., when resources are not shared amongst other virtual machines.) The controller component 114 can be configured to provide resources to such virtual machine to ensure that appropriate quality of service is achieved, even if additional resources must be supplied due to performance interference. This minimum level of quality of service can be denoted as $Q_0$. For some customers, it may be that provisioning resources beyond those required to achieve $Q_0$ may have additional value for which the customer is willing to pay. For instance, certain computations may be able to vary their level of accuracy, where a base level of accuracy is denoted as $Q_0$, but the customer may be willing to pay for marginal improvements beyond this. The system 200 allows customers to define additional quality of service states that convey the desire of a customer to achieve increased levels of quality of service, and supplemental resources can be allocated to virtual machines thereby increasing the overall utilization and revenue of a cloud computing service.

The relationship between quality of service and customer benefit is often captured by continuous utility functions. Though such functions are convenient from a mathematical perspective, they are practically difficult for a customer to define. Indeed, in the case where additional utility implies the willingness to pay extra for additional resources, it is likely that the mapping of utility to quality of service may not be continuous. Thus, the controller component 114 can provision resources based upon defined discrete levels of quality of service. These levels of quality of service can be provided that are over and above a threshold level of quality of service, and the customer can pay additional monies if the additional quality of service is achieved.

Given a set of discrete quality of service levels pertaining to each of the virtual machines 104-106, the controller component 114 can dynamically utilize surplus resources on a server, and allocate such resources amongst the virtual machines 104-106 (e.g., to substantially maximize profit). For instance, the controller component 114 can perform an optimization to determine which if any virtual machines may be able to run at an elevated quality of service level within available surface resources. Additionally, the controller component 114 can ensure that each of the virtual machines 104-106 achieves the threshold level of quality of service agreed upon between the customers and the cloud computing services provider. The controller component 114 can again utilize the MIMO model 202 to determine how resources can be provisioned. Therefore, in an example, customers can autonomously bid and purchase additional resources only when such additional resources are beneficial to them, while not disturbing other co-hosted virtual machines/applications.

Again, the MIMO model 202 may be a linear model, wherein the parameters can be learned at runtime. In another example, the MIMO model 202 may be nonlinear (e.g., modeled through utilization of a second order polynomial). If the MIMO model 202 is nonlinear, then in an example, the model can be learned prior to the virtual machines being placed on the cloud computing server. For example, virtual processor caps corresponding to the virtual machines can be varied randomly across an entire operating region in a staging system prior to the virtual machines being placed on the cloud computing server. This can be done to accurately model performance interference relationships across a wide range of controlled inputs. If the MIMO model 202 is a linear model such as has been described above, the MIMO model can be adapted dynamically using a small history of observed data obtained during online operation of the system 200.

Figure 3:
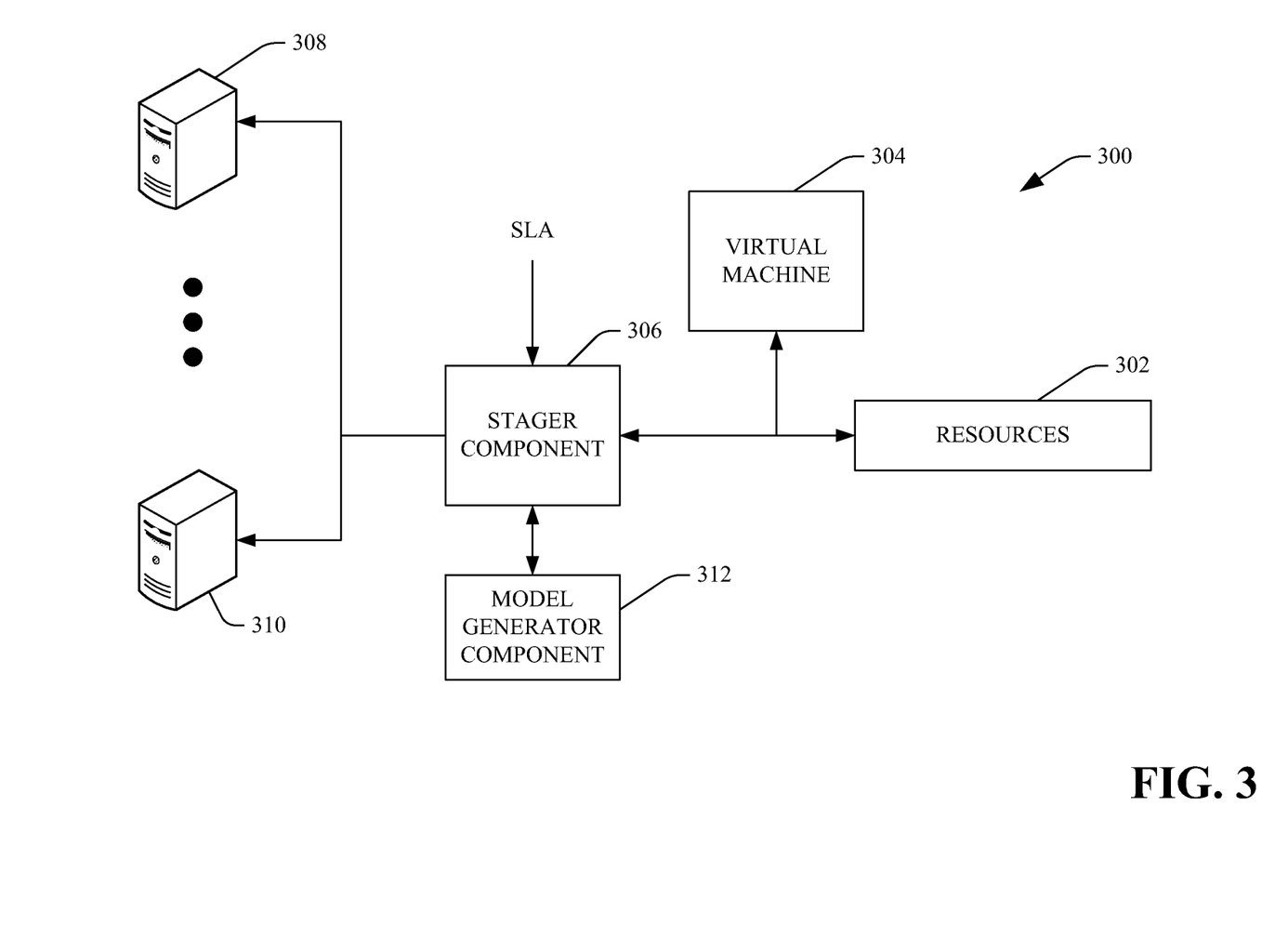
FIG. 3 is a functional block diagram of an example system that facilitates determining on which server to place a virtual machine with particular quality of service requirements.

Referring now to FIG. 3, an example system 300 that facilitates choosing upon which servers to place virtual machines is illustrated. The system 300 may be included in a cloud computing system, wherein a server or portion thereof is dedicated to determining where to place virtual machines (how to allocate virtual machines across a plurality of servers). The system 300 includes computing resources 302, wherein a virtual machine 304 accesses the computing resources 302 to perform computations. A customer corresponding to the virtual machine 304 may want the virtual machine 304 to have a particular level of quality of service corresponding thereto.

A stager component 306 can receive this level of quality of service in the form of a service level agreement, for example. The service level agreement may be negotiated between a provider of the cloud computing services and a customer corresponding to the virtual machine 304. For instance, the service level agreement may indicate that the customer wishes a particular number of instructions to be executed per second, a particular bandwidth to be maintained, etc. The stager component 306 can initialize the virtual machine 304 to begin executing. The stager component 306 can monitor the virtual machine 304 and the resources 302 to determine how much of the resources 302 are required to cause the virtual machine 304 to execute in accordance with the level of quality of service indicated in the service level agreement when the virtual machine 304 executes in isolation. Once an amount of resources is ascertained by the stager component 306, the stager component 306 can allocate additional "headroom" to the virtual machine 304. These additional resources allocated to the virtual machine 304 by the stager component 306 may take into consideration performance interference that occurs when the virtual machine 304 is sharing resources with one or more other virtual machines. An amount of headroom, for instance, can be estimated empirically. Based at least in part upon the resources required or allocated to the virtual machine 304, the stager component 306 can cause the virtual machine 304 to execute on one of a plurality of available servers 308-310. Therefore, the stager component 306 can be utilized to selectively place a plurality of virtual machines for execution on various cloud computing services.

As indicated above, it may be desirable to learn a MIMO model prior to placing the virtual machines on a cloud computing server. Thus, the system 300 can include a model generator component 312 that learns the MIMO model based at least in part on monitoring of quality of service achieved by the virtual machine 304 given different resource allocations. The MIMO model learned by the model generator component 312 can be dynamically updated when a plurality of virtual machines are sharing resources on a cloud computing server.

Figure 4:
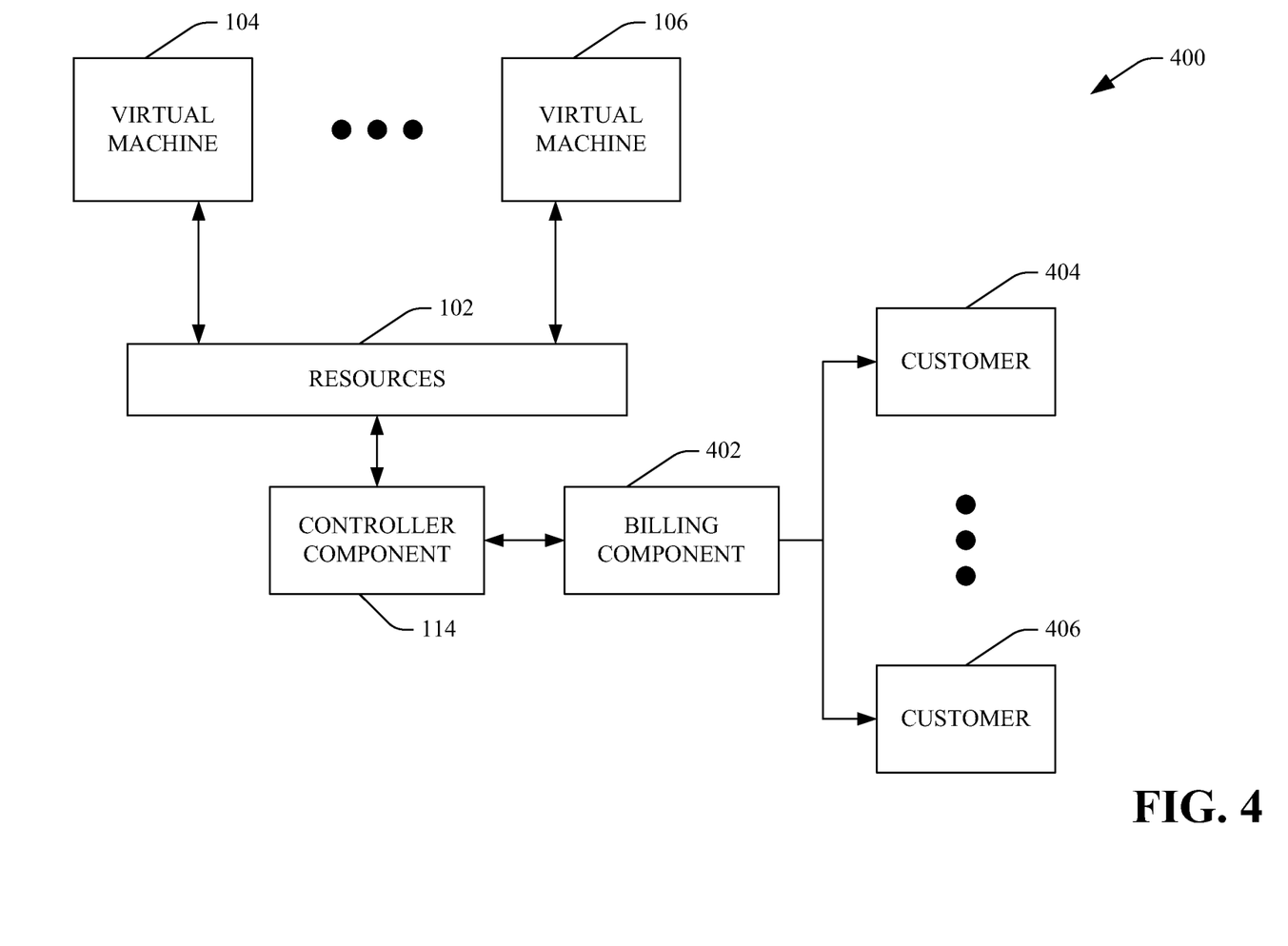
FIG. 4 is a functional block diagram of an example system that facilitates charging a customer based upon discrete levels of quality of service requested by such customer.

Referring now to FIG. 4, an example system 400 that facilitates invoicing customers for utilization of resources in a cloud computing environment is illustrated. The system 400 comprises the virtual machines 104-106 that share the computing resources 102 as has been described above. The system 400 also includes the controller component 114 that dynamically allocates resources to the virtual machines 104-106 to maintain threshold levels of quality of service in view of performance interference. As has been described previously, certain customers may be willing to pay for additional levels of quality of service. A billing component 402 can be in communication with the controller component 114, and can monitor levels of quality of service values experienced by the virtual machines 104-106. The billing component 402 may then invoice customers 404-406 that correspond to the virtual machines 104-106 based at least in part upon the levels of quality of service experienced by the virtual machines 104-106.

An invoice generated by the billing component 402 may include discrete levels of quality of service achieved by the virtual machines 104-106, times that such discrete quality of service states were achieved, rates for obtaining particular quality of service, etc. Pursuant to an example, the billing component 402 can be configured to automatically transmit invoices to the customers 404-406 by way of an electronic message. Furthermore, the billing component 402 may be configured to interact with the customers 404-406 in realtime. For example, the controller component 114 can indicate that additional resources are available to one or more of the virtual machines 104-106 executing on the cloud computing server. The billing component can receive such information from the controller component 114, and can transmit interactive data to the customers 404-406 to ascertain whether the customers 404-406 would be willing to pay for additional levels of quality of service when such levels are available. The customers 404-406 may then interact with the billing component 402 which can communicate with the controller component 114. For example, the customer 404 can receive a message indicating that an additional (higher) level of quality of service is currently available. The customer 404 may then choose to purchase higher level of quality of service, and the billing component 402 can generate an invoice for the quality of service provided to the customer 404.

Figure 5:
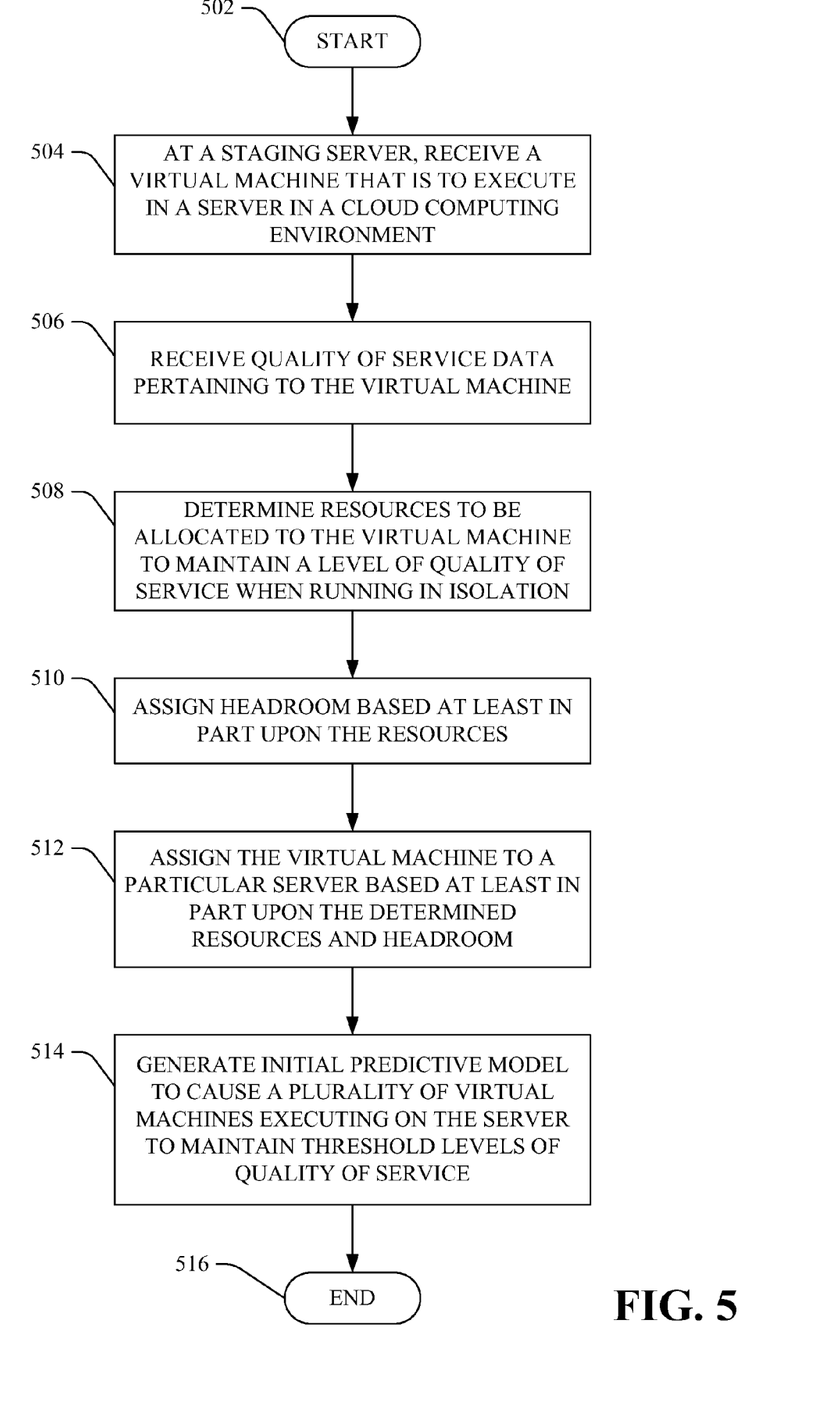
FIG. 5 is a flow diagram that illustrates an example methodology for selecting upon which computing server to place a virtual machine.
Figure 6:
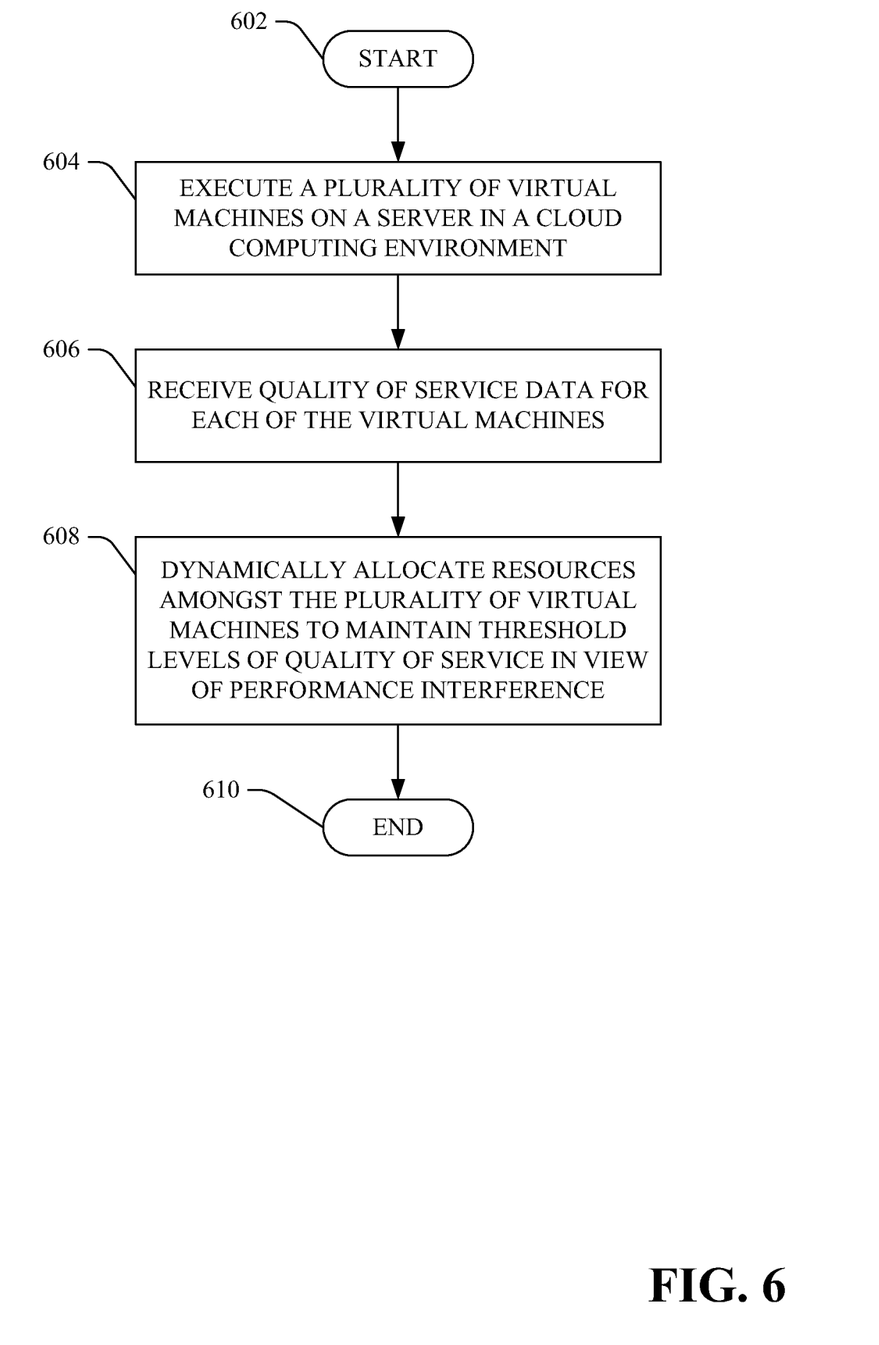
FIG. 6 is a flow diagram that illustrates an example methodology for dynamically allocating resources amongst a plurality of virtual machines to maintain certain levels of quality of service in view of performance interference.
Figure 7:
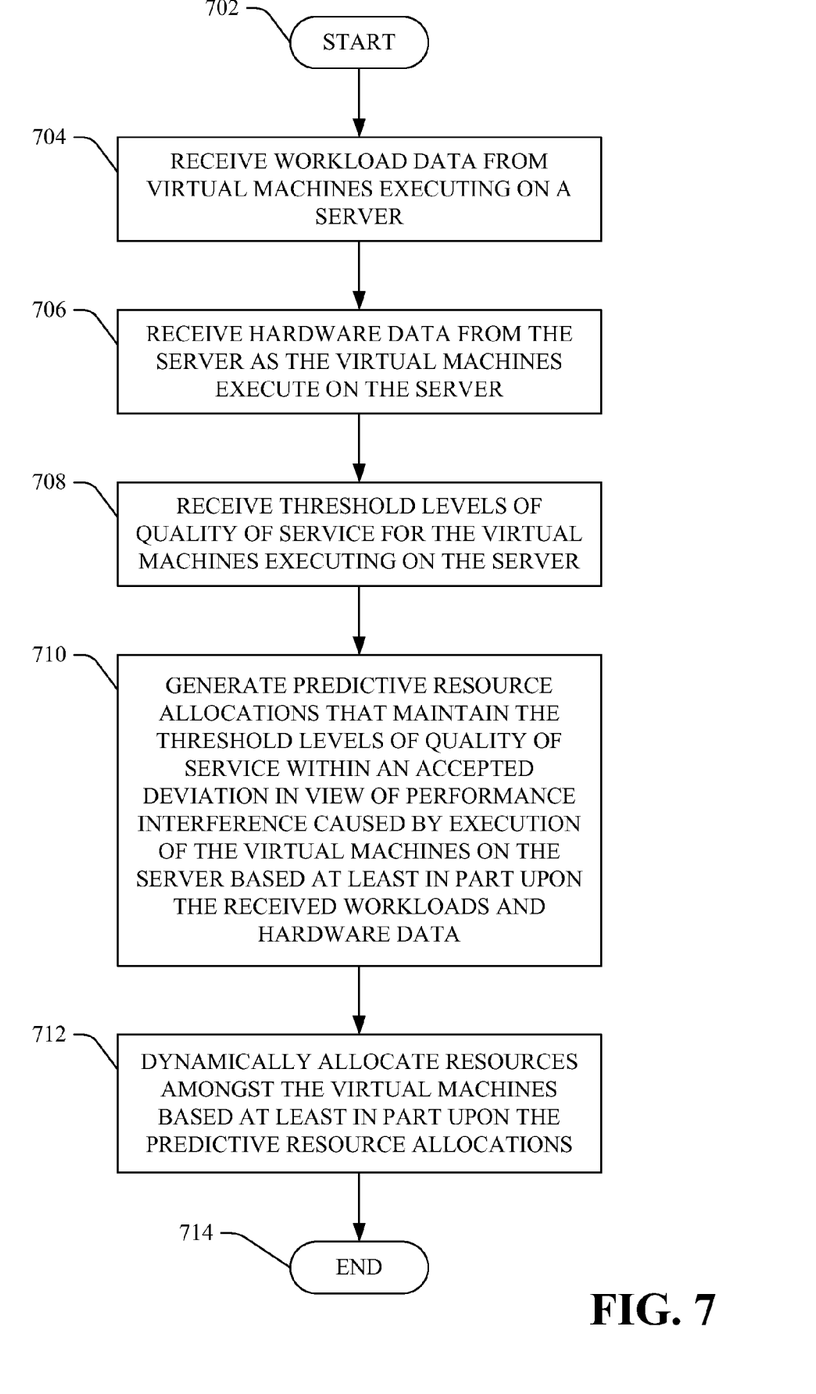
FIG. 7 is a flow diagram that illustrates an example methodology for dynamically allocating resources amongst virtual machines sharing such resources while taking into account performance interference effects caused by the virtual machines sharing resources on a cloud computing server.

With reference now to FIGS. 5-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 5, an example methodology 500 that facilitates dynamically allocating resources amongst virtual machines based at least in part upon performance interference is illustrated. The methodology 500 begins at 502, and at 504 at a staging server, a virtual machine that is to execute in a cloud computing environment is received. For example, a customer may request that an application to be executed in a virtual machine is desirably executed in a cloud computing environment.

At 506, quality of service data pertaining to the virtual machine is received. This quality of service data may include a particular level of quality of service that is desired by the customer. This level of quality of service may be defined in a service level agreement negotiated between the customer and the provider of the cloud computing services. Furthermore, the level of quality of service may be defined with respect to any suitable performance parameter.

At 508, resources to be allocated to the virtual machine to maintain the quality of service are determined when the virtual machine is executing in isolation on the staging server. Therefore, at 508 an amount of resources that would be required to maintain the threshold level of quality of service, absent any interference effects, can be ascertained.

At 510, headroom is assigned based at least in part upon the resources required by the virtual machine to maintain the threshold level of quality of service at the staging server. Headroom, as used herein, is additional resources that can be utilized to take into consideration performance interference between virtual machines executing on shared resources.

At 512, the virtual machine is assigned to a particular server in the cloud computing environment based at least in part upon the resources determined at 508 and the amount of headroom determined at 510. For example, one or more packing algorithms can be utilized to consolidate the virtual machine with several other virtual machines on the server.

Optionally, at 514 an initial predictive MIMO model can be generated/learned, wherein the MIMO model can be used to cause a plurality of virtual machines executing on the cloud computing server to maintain threshold levels of quality of service. In other words, the MIMO model can be utilized in connection with allocating resources such that each virtual machine executing on a server maintains at least a threshold level of quality of service. The methodology 500 completes at 516.

Referring now to FIG. 6, an example methodology 600 that facilitates dynamically allocating resources amongst a plurality of virtual machines that are sharing said resources is illustrated. The methodology 600 starts at 602, and at 604 a plurality of virtual machines are executed on a server in a cloud computing environment. At 606, quality of service data is received for each of the plurality of virtual machines. For example, the quality of service data may be minimum threshold levels of quality of service to be provided to each of the plurality of virtual machines. Furthermore, the quality of service data may comprise indications that certain customers are willing to pay for additional, discrete levels of quality of service, if sufficient computing resources are available.

At 608, resources are dynamically allocated amongst the plurality of virtual machines to maintain quality of service at or above a minimum threshold level of quality of service in view of performance interference effects experienced when a plurality of virtual machines share resources in a computing environment. The methodology 600 completes at 610.

Referring now to FIG. 7, an example methodology 700 for dynamically allocated resources amongst a plurality of virtual machines on a cloud computing server is illustrated. The methodology 700 starts at 702, and at 704 workload data from a plurality of virtual machines executing on a cloud computing server is received. The workload data may include certain quality of service data. For example, this workload data may be received over a virtual bus.

At 706, hardware data is received from the server as the virtual machines execute on such server. For instance, control actuators can be monitored, and such hardware data may be data output by such control actuators.

At 708, threshold levels of quality of service for the plurality of virtual machines executing on the server are received. At 710, predictive resource allocations that maintain the quality of service thresholds within an accepted deviation in view of performance interference caused by execution of the virtual machines on the server are generated. These resource allocations can be generated based at least in part upon the received workloads and the hardware data, and can be analyzed in connection with the threshold levels of quality of service. For instance, a MIMO model can be utilized to output such predictive resource allocations.

At 712, resources are dynamically allocated amongst the virtual machines based at least in part upon the predictive resource allocations. The methodology 700 completes at 714.

Figure 8:
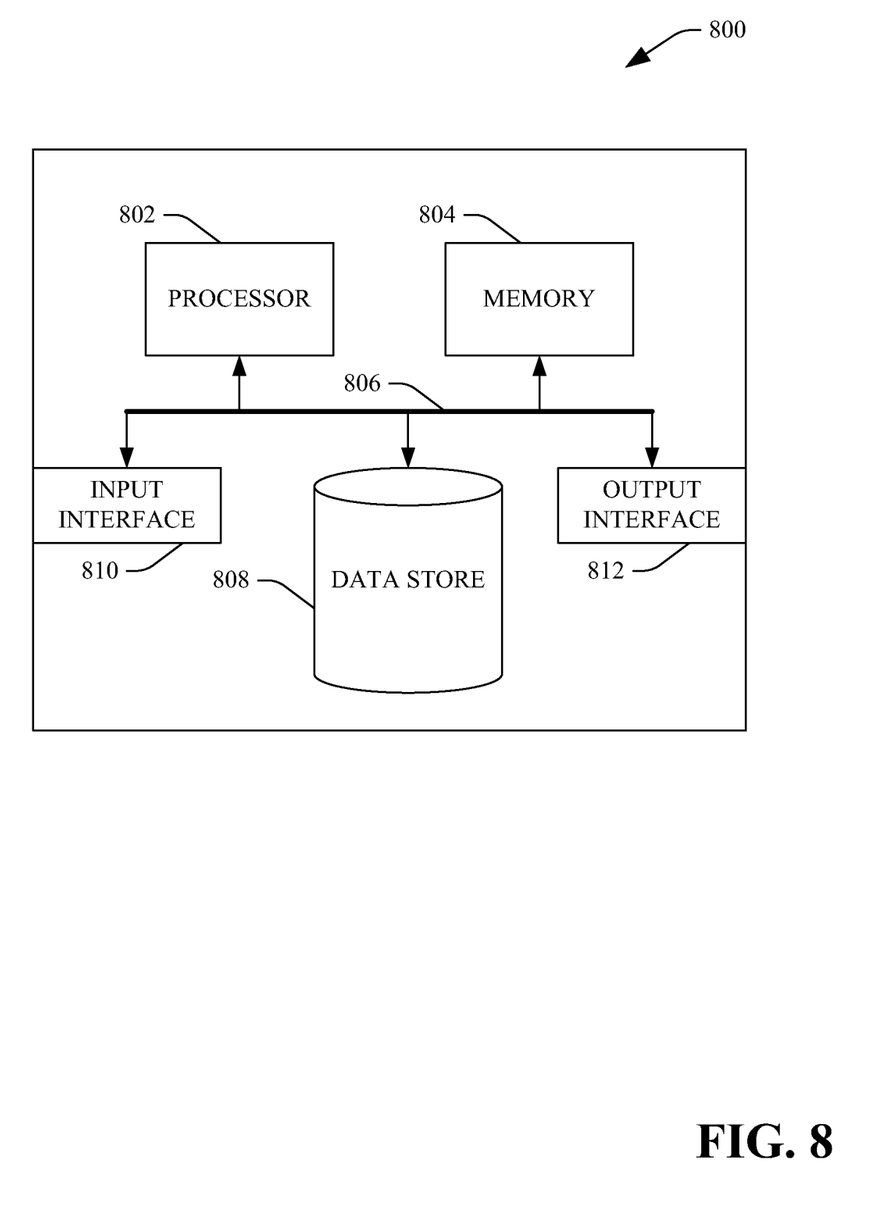
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports dynamically allocating resources amongst a plurality of virtual machines executing on a cloud computing server. In another example, at least a portion of the computing device 800 may be used in a system that supports determining upon which cloud computing server to put a virtual machine, based at least in part upon quality of service to be provide to such virtual machine. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store workload data from virtual machines, a multi-input/multi-output model that takes into consideration relationships between resources allocated to virtual machines and quality of service experienced by such virtual machines, amongst other data.

The computing device 800 additionally includes a data store 808 that is accessible by the processor 802 by way of the system bus 806. The data store 808 may be or include any suitable computer-readable storage, including a hard disk, memory, etc. The data store 808 may include executable instructions, workload information, data pertaining to hardware of a computing device, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   in a cloud computing environment, receiving indications of threshold levels of quality of service to maintain for each virtual machine of a plurality of virtual machines sharing computing resources on a server, wherein quality of service is affected by performance interference caused by the plurality of virtual machines sharing the computing resources on the server; and
   dynamically allocating computing resources amongst the plurality of virtual machines to maintain levels of quality of service for each virtual machine of the plurality of virtual machines at or above the threshold levels of quality of service, wherein the dynamically allocating the computing resources amongst the plurality of virtual machines is based at least in part upon a multi-input multi-output model that models the performance interference experienced by the plurality of virtual machines when executing on the server, wherein the multi-input multi-output model further models a relationship between quality of service experienced by the plurality of virtual machines and computing resources allocated to the plurality of virtual machines.

2. The method of claim 1, wherein the computing resources shared comprise at least one of processing resources, network resources, or input/output resources.

3. The method of claim 1, wherein an amount of computing resources required to maintain a threshold level of quality of service for a virtual machine changes over time as computing resources are shared amongst virtual machines.

4. The method of claim 1, wherein the levels of quality of service pertain to a number of instructions executed per second or a speed of memory accesses.

5. The method of claim 1, further comprising provisioning resources of the server to a virtual machine such that the virtual machine experiences an increased level of quality of service above a threshold level of quality of service based at least in part upon an indication that a customer corresponding to the virtual machine is willing to pay for the increased level of quality of service and levels of quality of service for other virtual machines executing on the server remains at or above the threshold levels of quality of service.

6. The method of claim 1, wherein the threshold levels of quality of service for each of the virtual machines is independently defined in service level agreements between a provider of cloud computing services and customers that correspond to the virtual machines.

7. The method of claim 1, wherein the multi-input multi-output model is dynamically updated based at least in part upon workload feedback from the plurality of virtual machines executing on the server.

8. The method of claim 7, wherein the multi-input multi-output model is dynamically updated based at least in part upon measured physical parameters of the server.

9. The method of claim 1, wherein the multi-input multi-output model is a discrete-time multi-input multi-output model.

10. The method of claim 1, further comprising:
    determining which virtual machines to place on the server;
    learning the multi-input multi-output model based at least in part upon varying resources allocated to the virtual machines when the virtual machines were at a staging server executing in isolation; and
    dynamically updating the multi-input multi-output model at runtime based at least in part upon observed workloads of the virtual machines and computing resources allocated to the virtual machines.

11. The method of claim 1, wherein the multi-input multi-output model is a linear model.

12. The method of claim 1, wherein the server is a multi-core server.

13. A system comprising:
    a processor; and
    a memory comprising a plurality of components executed by a processor, the plurality of components comprising:
       a receiver component that receives threshold levels of quality of service that correspond, respectively, to a plurality of virtual machines executing on a server, wherein the plurality of virtual machines executing on the server share computing resources of such server; and
       a controller component that dynamically provisions resources amongst the plurality of virtual machines to maintain the threshold levels of quality of service for the respective plurality of virtual machines based at least in part upon a modeled relationship between computing resource allocations amongst the plurality of virtual machines and quality of service experienced by the plurality of virtual machines.

14. The system of claim 13, wherein the server is a multi-core server.

15. The system of claim 13, the plurality of components further comprising:
    an updater component that updates a multi-input multi-output model that models the relationship between the resource allocations amongst the plurality of virtual machines and the quality of service experienced by the plurality of virtual machines based at least in part upon monitored physical parameters of the server.

16. The system of claim 15, wherein the updater component receives workload data from each of the plurality of virtual machines, and wherein the updater component updates the multi-input multi-output model based at least in part upon the workload data.

17. The system of claim 13, wherein the resources shared comprise at least one of processing resources, memory resources, network resources, or input/output resources.

18. The system of claim 13, wherein the levels of quality of service pertain to a number of instructions executed per second or a speed of memory accesses.

19. A computer-readable memory comprising instructions that, when executed by a processor, cause the processor to perform acts comprising:
    executing a plurality of virtual machines on a multi-core server, wherein each virtual machine of the plurality of virtual machines is to experience a respective threshold level of quality of service, wherein the plurality of virtual machines share computing resources of the multi-core server;

accessing a computer-implemented multi-input, multi-output model that models performance interference experienced by the plurality of virtual machines;

providing performance feedback from each of the plurality of virtual machines executing on the multi-core server to the computer-implemented multi-input, multi-output model;

providing data indicative of computing resources allocated to each of the plurality of machines executing on the multi-core server to the multi-input, multi-output model;

receiving predictive levels of quality of service experienced by the plurality of virtual machines from the multi-input multi-output model based at least in part upon the performance feedback and data indicative of computing resources provided to the multi-input multi-output model; and dynamically allocating computing resources amongst the plurality of virtual machines to maintain quality of service experienced by each virtual machine of the plurality of virtual machines at or above the respective threshold level of quality of service based at least in part upon the predictive levels of quality of service.

* * * * *